United States Patent [19]

Eckner

[11] Patent Number: 4,481,239

[45] Date of Patent: Nov. 6, 1984

[54] PROCESS FOR COATING METALLIC SUBSTRATES, AND USE OF THE PRODUCTS PREPARED IN THIS PROCESS

[75] Inventor: Günter Eckner, Hofheim am Taunus, Fed. Rep. of Germany

[73] Assignee: Hoechst Aktiengesellschaft, Fed. Rep. of Germany

[21] Appl. No.: 520,162

[22] Filed: Aug. 4, 1983

[30] Foreign Application Priority Data

Aug. 7, 1982 [DE] Fed. Rep. of Germany ....... 3229563

[51] Int. Cl.[3] ........................... B32B 1/08; B05D 3/02

[52] U.S. Cl. ...................................... 428/36; 138/145; 138/177; 138/DIG. 6; 138/DIG. 7; 156/150; 156/151; 156/187; 427/29; 427/195; 427/202; 427/203; 427/409; 427/410; 428/416; 428/458; 428/463

[58] Field of Search ................. 427/29, 195, 202, 203, 427/120, 409, 410; 428/35, 416, 458, 463; 138/145, 177, DIG. 6, DIG. 7; 156/150, 151, 187

[56] References Cited

U.S. PATENT DOCUMENTS

| | | | |
|---|---|---|---|
| 3,377,183 | 4/1968 | Hurt, Jr. et al. | 427/29 |
| 4,048,355 | 9/1977 | Sakayori et al. | 427/410 X |
| 4,104,416 | 8/1978 | Parthasarathy et al. | 427/202 X |
| 4,213,486 | 7/1980 | Samour et al. | 427/29 X |

*Primary Examiner*—Thurman K. Page

*Attorney, Agent, or Firm*—Charles A. Muserlian

[57] ABSTRACT

A process for coating metallic substrates in several stages with heat-hardenable synthetic resins having functional groups from the group comprising hydroxyl-containing polyesters, crosslinkable acrylate resins and epoxy resins, thermally stabilized ethylene copolymers and, if appropriate, polyolefins, in which, in the first stage, a powder mixture of these components is applied to a metallic substrate at a preheating temperature which is above the melting point of the (A) resins and which is adequate for their crosslinking, and, in the second stage, an olefin polymer layer is applied to the hot, coated substrate. The metallic substrates are pipes, large moldings, vessels and building elements, the coated pipes being advantageously used as pipelines for petroleum and natural gas.

16 Claims, No Drawings

PROCESS FOR COATING METALLIC SUBSTRATES, AND USE OF THE PRODUCTS PREPARED IN THIS PROCESS

In a known process, an adhesive is continuously applied to steel pipes before they are coated, in particular before they are heated; the pipes are then raised to the temperature necessary to melt the pulverulent plastic with which the pipes are to be coated; and the pipes are then coated with the plastic by fluid-bed sintering and then cooled down. Following the coating step, a web of reinforcing material is applied to the coating of plastic material which is still in the plastic state, and is embedded in the plastic material.

It is also known to wrap pipes with polyethylene tapes by, first of all, coating a pretreated, for example zinc-coated or sand-blasted, pipe with an adhesive and applying thereto the plastic wrapping from an extruder. A further adhesive layer is then applied, followed, finally, by a further plastic wrapping, the plastic layer being in each case made of high-pressure polyethylene. Nothing is disclosed in this piece of prior art about the nature of the adhesive.

European Pat. No. A26,906 has also already described a process for coating metal pipes through applying polyethylene powder to preheated pipes by, first of all, applying a polyethylene which has a melt flow index of 15 to 70, preferably 17 to 25, g/10 minutes to a metal pipe which has a temperature of at least 200° C., allowing the coating to cool down to a temperature of about 110° to 170° C., preferably 110° to 120° C., and then, in a third stage, applying at this temperature a self-supporting polyethylene film, for example a tape having a melt flow index of 0.1 to 7 g/10 minutes. In an embodiment of this process it is possible to add to the polyethylene powder an additional resin in the form of a polymer, for example polyvinyl acetate, ethylene/vinyl acetate copolymer, ethylene/acrylic acid and/or acrylic ester copolymer, if appropriate together with further comonomers, or to apply these polymers to the pipe before the polyethylene powder is applied, in both cases in an amount of 2 to 5% by weight, relative to polyethylene. The melt flow indices, here and in the following, relate always to 190° C./2.16 kg.

Another known process (German Offenlegungsschrift No. 2,946,459) proposes the coating of metal pipes through applying polyethylene to preheated pipes by, first of all, applying a polyethylene powder having a melt flow index of about 1.2 to 1.7 g/10 minutes or a tape as it emerges from an extruder with a melt flow index of at most 1.7 g/10 minutes to a metal pipe which, in the case of the powder coating, has a temperature of at least 300° C. and, in the case of the coating from the extruder, at most 250° C., allowing the coating to cool down to a temperature of about 110° to 170° C., and then, in a third stage, applying at this temperature a pale, optically stabilized selfsupporting polyethylene film having a melt flow index of 0.4 to 1.1 g/10 minutes. Also in this process, the abovementioned polymers can be admixed to the polyethylene or be separately applied to the pipe.

It is also known to coat pipes with epoxy resins, for example from German Offenlegungsschrift No. 2,944,809. Pipes coated in this way are highly resistant to moisture and mechanical damage, for example from impact, knocks and the like. Attempts have been made to wrap these expoxy-coated pipes with polyethylene, but adhesion problems were encountered between the polyethylene layer and the epoxy layer underneath. For this reason adhesion promoters have been used between these two layers, the adhesion promoters having been selected from a great variety of materials which were applied by a great variety of methods, for example hot melt adhesives, frequently based on ethylene/acrylic acid copolymers, as well as extruded plastic tapes were applied as the intermediate layer.

German Pat. No. 1,965,802, for instance, discloses a process for wrapping a steel pipe by, first of all, wrapping an extruded acrylic ethylene copolymer tape around a hardenable epoxy resin layer, followed by a likewise extruded polyethylene tape. The two tapes are pressed against the hot pipe surface by a resilient contact roll and then cooled down with water. It is true that this process affords good results, but the threestage processing makes it complicated.

For certain purposes it is desirable to modify or improve the existing processes, in particular the threelayer process, the layers consisting of epoxy resin/acrylic ethylene copolymer/polyethylene, and the products prepared thereby.

The present invention relates to a process for coating metallic substrates of the type defined in the claims.

The process of the invention makes it possible, for example, to prepare coated pipes which withstand even difficult pipe-laying conditions, for example the transport across heavy or stony ground, without incurring damage to the coating. In addition, the adhesion obtained is better than, at least equal to, that known from the state of the art. Finally the process is considerably simplified. For instance, it is no longer necessary to apply the adhesion promoter in a separate step; on the contrary, application of the multicomponent powder mixture used in the invention to the hot substrate ensures all favorable properties of the coating. The sole function left to the concluding polyolefin layer, which has been firmly bonded to the base layer, is that of external protection.

Before the first powder layer is applied the metallic substrate is advantageously preheated to a temperature of 200° to 360° C., preferably 240° to 310° C. The temperature to which the metallic substrate is heated depends on the polyofelin content in the powder mixture. The layer applied in the first stage generally has a thickness of 40 to 450, preferably 100 to 350, in particular 150 to 250, $\mu$m. Application of a layer of a hardenable resin (A), copolymer (B) and, if appropriate, polyolefin (C) ensures that this layer has an adequate hardness, adhesive strength and thermal resistance. This layer can be applied, for example, electrostatically, by spraying under pressure (spray gun), by granular-bed sintering or by showering.

The proportion of component (A) in the mixture is 10–45, preferably 15–35, % by weight, relative to components (A) and (B).

The mixture is generally admixed with customary amount of the compounds necessary to harden the resins used, but commercially available resin/hardening agent mixtures are also used at times. The proportion of hardening substances is contained in the quantities for component (A). Epoxy resins are particularly preferred of the heat-hardenable synthetic resins (A). Examples of suitable resins are solid resins based on diphenylolpropane and/or diphenylolmethane and epihalogenohydrin, such as epibromohydrin, but in particular epichlorohydrin, having an epoxide equivalent weight of 600 to 2,000, preferably 700 to 1,500, in particular 875 to 1,100, if appropriate even a mixture of several epoxy resins.

Examples of suitable hardening agents for the epoxy resins are polycarboxylic anhydrides, polyamidoamines, secondary and tertiary amines, dicyanodiamide and biguanide and substituted compounds derived therefrom, amino resins such as melamine resins, hexamethylenetetramine in conjunction with phenolic resins of the novolak type, phenolic resins, COOH-functional polyesters and acrylic resins, singly or mixed.

Examples of suitable hardenable polyesters are unsaturated polyesters which have free OH groups and which are hardened with polycarboxylic acids, anhydrides thereof and/or with free or blocked polyisocyanates.

Examples of hardenable acrylic resins are selfcrosslinking etherified methoxylated resins based on acrylamides and/or methacrylamides. It is also possible to use resins of acrylates and/or methacrylates of polyhydric alcohols which are hardened with amines, especially amino resins, or with polyisocyanates. Also suitable are acrylic resins which have built-in glycidyl groups and which are hardened with polycarboxylic acid components.

The particle size of resins (A) in the powder mixture can vary widely. For instance, it is possible to use epoxy resins having a particle size of, for example, 0.2–300, preferably 1–100, μm; the particle size of the other (A) resins is, for example, between 0.5 and 600, preferably between 1 and 300, in particular between 1 and 100 μm.

The component (B) of the powder mixture, where the expression "vinyl compounds" includes (meth)acrylic acid derivatives, generally has a proportion of 55 to 90, preferably 65 to 85, % by weight, relative to components (A) and (B), and contains, as essential constituent, at least one copolymer based on ethylene and (meth)acrylic acid and, if appropriate, at least one further copolymerizable monomer. However, it is also possible to use copolymers which are free of (meth)acrylic acid. Examples of copolymerizable monomers are vinyl acetate, (meth)acrylates having 1 to 18 carbon atoms in the alkyl radical, and others. The component (B) can have a different chemical composition, and the vinyl acetate content in the copolymer can have been wholly or partly hydrolyzed to form the vinyl alcohol radical. It can contain as constituent, for example, (a) a vinyl acetate/ethylene/(meth)acrylic acid/(meth)acrylate copolymer (melt flow index: for example about 15–30 g/10 minutes), (b) a vinyl acetate/ethylene/(meth)acrylic acid copolymer (melt flow index: for example about 20–35 g/10 minutes), (c) a vinyl acetate/ethylene/vinyl alcohol copolymer (melt flow index: for example about 55–75 g/10 minutes), (d) a (meth)acrylic acid/ethylene copolymer containing at least 85% by weight of ethylene (melt flow index: for example about 5 to 80 g/10 minutes) or (e) (meth)acrylate/(meth)acrylic acid/ethylene copolymer containing at least 80% by weight of ethylene (melt flow index: for example 10 to 50 g/10 minutes. The monomer content for preparing the copolymer can amount to (a) for example 5 to 10% by weight of vinyl acetate, 5 to 10% by weight of acrylic and/or methacrylic acid, 0.5 to 10% by weight of acrylate and/or methacrylate and at least 70% by weight of ethylene, for copolymer (b)0.5 to 10% by weight of vinyl acetate, 5 to 10% by weight of acrylic and/or methacrylic acid and at least 80% of ethylene, for copolymer (c) 0.5 to 10% by weight of vinyl acetate, 5 to 25% by weight of vinyl alcohol and at least 65% by weight of ethylene, for copolymer (d) 1 to 15% by weight of (meth)acrylic acid and at least 85% by weight of ethylene, and for copolymer (e) 0.5 to 10% by weight of (meth)acrylic acid, 0.5 to 10% by weight of (meth)acrylic acid and at least 80% by weight of ethylene. The ester group of the acrylate or methacrylate component derives from monohydric alcohols having 1 to 18 carbon atoms. The copolymers of compound (B) are stabilized against influence of heat.

The particle size of copolymers (B) can be, for example, between 0.5 and 600, preferably between 1 and 200, μm.

Component (C) can be a polyolefin added to the mixture of heat-hardenable resin (A) and copolymer (B). Component (C) can also have added to it additives such as polyvinyl acetate, carbon black and thermal stabilizers. The proportion of component (C) in the total mixture (A) to (C) is generally 0 to 25, preferably 5 to 15, % by weight, relative to the total amount of components (A) and (B). The additives present in (C) can amount to a total of 10% by weight, relative to (C).

The olefin polymer layer applied in the second stage, which can be up to about 6 mm, preferably 1.5 to 4 mm, thick, serves to protect the base layer against injuries. It advantageously has a pale color and can have been optically stabilized. It can be applied, for example, in the form of a powder or, in the case of articles of suitable shape, in particular pipes, in the form of a tape, in a thickness of 100 to 400 μm, preferably 150 to 250 μm, for example 0.2 mm. Suitable olefin polymers have a melt flow index of, for example, 0.3 to 25, preferably 0.5 to 20 g/10 minutes. The olefin polymer consists, for example, of polyethylene, for example a polyethylene powder from the group comprising LLD, LD, HD or mixtures thereof, polypropylene or ethylene copolymers, for example those which are made of the same components as the copolymers of the adhesive material layer. However, the copolymers can also differ from those of the adhesive material layer.

Examples of optical stabilizers for the pale polyolefin film are compounds of the benzotriazole type or other compounds suitable for stabilizing.

A pale toplayer has the advantage, for example, to effect good protection of the pipes against excessive heating up on prolonged outdoor storage under extreme heat, for example from the sun or due to laying in very hot soil layers.

If pale olefin polymer material is used, it is preferably white. However, it is also possible to choose a different color, for example the warning color yellow or even pale orange, pale blue, pale green or the like. The pale tapes can, if appropriate, even be used to label the pipes.

Coating from the extruder also takes a very simple and time-saving form without a need for additional equipment. The tape emerging from the extruder advantageously has a melt flow index of at least 0.4 g/10 minutes.

The olefin polymer in the second powder coating stage advantageously has a particle size of 1 to 600 μm, preferably 100 to 400 μm. A polyethylene film, for example in coating the pipe, is advantageously applied in the form of a self-supporting polyethylene tape. The application can take place onto a rotating pipe. This arrangement has the advantage that the tape is wound round the pipe automatically. The width of the tape can be of any size. It is, for example, at least 20 mm. The width of tape generally used is up to about 1 m. In applying the tape, care should be taken to ensure that the individual turns overlap or that the turns are mutually welded together, to obtain satisfactory corrosion protection.

Under the conditions of the first process stage the components of the powder mixture become partly desegregated because the individual components differ in electrical chargeability. The (A) resins are high charge carriers and move accordingly fast, in particular in an electrostatic coating process, to the metal surface, where they melt at once as a result of the high preheating temperature and crosslink at once, depending on their nature and the hardening agent added. Even if they are sprayed on by means of compressed air, the particles become charged as a result of mutual friction. The preheating temperature should be so high as to be above the melting point of resin (A) and be adequate for the crosslinking. During this step, the (B) copolymers are largely kept away from the metal surface.

The same is true of the optionally present polyolefin (C). In general, however, there are formed at least two zones rich in the individual components, the presence of polyolefin (C) further improving the bond between the base layer and the olefin polymer applied in the second stage, as a result of similarity between the materials at the interface. This holds in particular when polyolefin is applied in the form of a sheet-like structure. The result is thus a base layer which has individual zones in which the individual components of the powder mixture predominate. The olefin polymer, for example polyethylene, is applied, as described, to the hot, hardened or hardening molten mixture at a substrate temperature of at most 260° C. if a polyolefin tape is applied, whereas if a powder is applied the temperature can be up to 360, preferably up to 300, °C. This statement also holds for applying the powder mixture (A) to (C) when it contains polyethylene. When the polyolefin layer has been applied the substrate is cooled down, for example in air or by water cooling.

If the olefin polymer applied in the second process stage consists of an ethylene/vinyl acetate/acrylic or methacrylic acid copolymer, it is advantageous to use a copolymer of this type whose vinyl acetate content amounts to 15 to 50, preferably 25 to 40, % by weight and whose acrylic or methacrylic acid content amounts to 4 to 15, preferably 6 to 12, % by weight.

The speed with which the coating is carried out can vary widely. It depends on the layer thickness and the metallic substrate. For example, a pipe having an external diameter of 50 to 2,000 mm requires a minimum film thickness between 1.5 and 4 mm for adequate corrosion protection. To coat such a pipe of normally 12 m length and a diameter of 1,500 mm with a 3.5 mm thick coating requires in the process of the invention, for example, about 15 to 45, generally about 30 minutes. To coat a pipe having a diameter of 400 mm with a layer thickness of 1.5 mm generally requires for a 12 m length about 8 to 20, for example 15, minutes.

The coatings prepared in the manner of the invention fully meet the DIN No. 30,670 and DIN No. 30,671 requirements in respect of minimum film thickness, nonporosity, peel strength, impact strength, indentation resistance, tensile strength, specific wrapping resistance and thermal and optical aging. For example, according to DIN No. 30,670 the mean force required for pulling off the wrapping is 35 N/cm of strip width.

The metallic substrates which are coated by the process of the invention and which can consist of nonferrous metals, such as aluminum, copper, brass, bronze and zinc, but especially of iron or steel, find many and varied uses. They are preferably pipes which, owing to their surface protection, are useful especially for pipelines, for example for transporting petroleum, or even other gaseous, fluid or highly viscous materials, for example natural gas, water, water treatment sludge, concrete, waste waters, slurries or the like.

It is a particular advantage that the pipes coated by the process of the invention have increased thermal resistance, so that material that is being conveyed and has an elevated temperature, for example up to about 160° C., for example hot liquids, can be conveyed for prolonged periods without impairing the coating. The transporting of hot liquids is necessary, for example, when the pipes are arranged behind compressor stations. In these stations the medium to be conveyed is heated up to temperatures of, for example, about 150° C. In the pipe section following a compressor station there is thus a thermal stress which is between the ambient temperature and 150° C.

The pipes coated by the process of the invention are particularly advantageously used for laying in warm or hot areas, for example even in the desert.

However, the process of the invention can also be used to coat metallic substrates other than pipes where a particularly resistant surface protection is critical. For example, it is possible to coat large metallic moldings, vessels, building elements and the like, the enumeration being incomplete and the process having to be adapted to particular circumstances, for example to a coating on the inside.

In the following examples parts are parts by weight and % is percent by weight.

Example

1. An iron pipe (external diameter: 108 mm; wall thickness 10 mm) was preheated to a temperature of 300° C. A powder mixture of an eposy resin based on diphenylolpropane and ephichlorohydrin (epoxide equivalent weight: 875 to 1,100) which contained 5% of hardening agent based on cyclic tertiary amines, and a thermally stabilized acrylic acid/ethylene copolymer which contained about 92% by weight of ethylene (melt flow index: 10 g/10 minutes) in a mixing ratio of 20:80 was electrostatically applied in a layer thickness of 200 μm at a charge of 60 KV. When this layer had cooled down to 250° C., a polyethylene powder having a melt flow index of less than 2 g/10 minutes was showered on in the course of 2 minutes. The heat of the hot pipe melted the layers into a homogeneous film having total thickness of 2.2 mm. The pipe cooled without additional cooling to 160° C. in the course of 15 minutes, to 30° C. in the course of a further 45 minutes or was cooled down by means of water. The DIN No. 30,670 peel strength was 100 N per cm; The British Gas Standard PS/CW 6, June 1977, Appendix A disbonding test gave a value of 3 mm.

2. An iron pipe (external diameter: 108 mm; wall thickness: 10 mm) was preheated to 260° C. A powder mixture of the epoxy resin of Example 1 and a vinyl acetate/ethylene/acrylic acid copolymer (weight ratio: 3:86:11; melt flow index: 20 g/10 minutes) was electrostatically applied in a mixing ratio of 30:70 in a film thickness of 150 μm at a voltage of 60 KV. An LLD polyethylene powder having a melt flow index of 20 g/10 minutes was showered onto this layer and it formed a layer of 2.5 mm thickness after a showering time of 2 minutes. 5 minutes later the layer had melted homogeneously and smoothly, and the temperature had dropped to 190° C. Internal cooling of the pipes with air cooled the pipe down to 50° C. in the course of 10 minutes. Peel strength: 80 N/cm; disbonding test: 2 mm.

3. An iron pipe (external diameter: 108 mm; wall thickness: 10 mm) was preheated to 250° C. A powder mixture of the epoxy resin of Example 1, an acrylate/ethylene/acrylic acid copolymer (weight ratio: 7:88:5; melt flow index: 10 g/10 minutes) and a polyethylene powder (melt flow index: 20 g/10 minutes) which contained 5% of polyvinyl acetate, 3% of carbon black and 2,400 ppm of a thermal stabilizer was electrostatically applied in a mixing ratio of 20:70:10, all proportions being in percent by weight, in a layer thickness of 160 μm at 80 KV, and polyethylene having a melt flow index of 0.3 g/10 minutes was applied from an extruder in the form of a tube in a film thickness of 3 mm. The homogeneous coating was cooled down by trickling water onto the surface. Peel strength: 60 N per cm; disbonding test: 3.5 mm.

4. Example 1 was repeated, except that the copolymer used was a vinyl acetate/ethylene/vinyl alcohol copolymer having a melt flow index of 65 g/10 minutes (weight ratio: 2:81:17) and the powder mixture was sprayed on by means of compressed air, affording a peel strength of 50 N/cm and a disbonding test value of 6 mm.

We claim:

1. A process for coating metallic substrates which comprises applying in a first stage and powder mixture based on (A) 10–45% by weight of at least one heat-hardenable synthetic resin having functional groups selected from the group consisting of hydroxyl-containing polyesters, epoxy resins, both in combination with hardening agents and crosslinkable acrylate resins per se or in combination with hardening agents, (B) 55–90% by weight of at least one stabilized ethylene copolymer based on ethylene and vinyl compounds and (C) 0–25% by weight of polyolefin, relative to the total amount of components (A) and (B), to a metallic substrate pre-heated to a temperature which is above the melting point of the resins (A) and which is adequate for their crosslinking, to form a first layer and applying, in a second state, a layer of an olefin polymer in the form of a tape or as a powder to the hot, coated substrate.

2. A process as claimed in claim 1, wherein the resin (A) used is an epoxy resin based on diphenylolpropane and/or diphenylolmethane and epihalogenogydrin having an epoxide equivalent weight of 600 to 2,000.

3. A process as claimed in claim 2, wherein the resin (A) has an epoxide equivalent weight of 700 to 1,500.

4. A process as claimed in claim 1, wherein the first layer is applied in a thickness of 40 to 450 μm.

5. A process as claimed in claim 4, wherein the first layer has a thickness of 100 to 350 μm.

6. A process as claimed in claim 1, wherein the second layer is applied in the form of polyethylene in a layer which is up to 6 mm thick.

7. A process as claimed in claim 6, wherein the second layer is 1.5 to 4 mm thick.

8. A process as claimed in claim 1, wherein the first layer is applied electrostatically, by spraying under pressure, by whirl sintering or by showering.

9. A process as claimed in claim 1, wherein the metallic substrate is pre-heated to a temperature in the range from 200° C. to 360° C.

10. A process as claimed in claim 9, wherein the temperature is in the range from 240° C. to 310° C.

11. A process as claimed in claim 1, wherein epoxy resins used as component (A) have particle sizes in the range from 0.2 to 300 μm, polyester and acrylic resins used as components (A) have particle sizes in the range from 0.5 to 600 μm and component (B) has a particle size in the range from 0.5 to 600 μm.

12. A process as claimed in claim 11, wherein the particle sizes are 1 to 100 μm in the case of epoxy resins and 1 to 300 μm in the case of polyester and acrylic resins and 1 to 200 μm in the case of component (B).

13. A process as claimed in claim 1, wherein the powder mixture is based on 15–35% by weight of component (A), 65–85% by weight of component (B), and 5–15% by weight, relative to the total amount of components (A) and (B), of component (C).

14. A process for coating metallic substrates which comprises applying in a first stage a powder mixture based on (A) 10–45% by weight of at least one heat-hardenable synthetic resin having functional groups selected from the group consisting of epoxy resins having an epoxide equivalent weight of 600 to 2,000, with a particle size of from 0.2 to 300 μm, and hydroxy-containing polyesters, either in combination with hardening agents and crosslinkable acrylate resins per se or in combination with hardening agents, each with a particle size of from 0.5 to 600 μm, (B) 55–90% by weight of at least one stabilized copolymer based on ethylene and vinyl compounds with a particle size of from 0.5 to 600 μm and (C) 0–25% by weight of polyolefin, relative to the total amount of components (A) and (B), to a metallic substrate pre-heated to a temperature in the range from 200° to 360° C. which is above the melting point of the resins (A) and which is adequate for their crosslinking, as a first layer in a thickness of 40 to 450 μm, and applying, in a second stage, a layer of polyethylene which is up to 6 mm thick in the form of a tape or a powder to the hot, coated substrate.

15. Metallic substrates in the form of pipes coated by the process as claimed in claim 1.

16. Metallic substrates as claimed in claim 15 in the form of pipes useful for pipelines for petroleum and natural gas.

* * * * *